(12) United States Patent
Aschauer et al.

(10) Patent No.: US 11,303,440 B2
(45) Date of Patent: Apr. 12, 2022

(54) METHOD AND PROGRAMMABLE HARDWARE SECURITY MODULE

(71) Applicant: Siemens Aktiengesellschaft, Munich (DE)

(72) Inventors: Hans Aschauer, Munich (DE); Daniel Schneider, Munich (DE); Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 31 days.

(21) Appl. No.: 16/484,015

(22) PCT Filed: Dec. 28, 2017

(86) PCT No.: PCT/EP2017/084690
§ 371 (c)(1),
(2) Date: Aug. 6, 2019

(87) PCT Pub. No.: WO2018/145805
PCT Pub. Date: Aug. 16, 2018

(65) Prior Publication Data
US 2019/0394034 A1    Dec. 26, 2019

(30) Foreign Application Priority Data
Feb. 7, 2017    (DE) .................... 10 2017 201 891.7

(51) Int. Cl.
*H04L 29/06*    (2006.01)
*H04L 9/08*    (2006.01)
*H04L 9/32*    (2006.01)

(52) U.S. Cl.
CPC .......... *H04L 9/0877* (2013.01); *H04L 9/0822* (2013.01); *H04L 9/0897* (2013.01); *H04L 9/3263* (2013.01)

(58) Field of Classification Search
CPC ... H04L 9/0877; H04L 9/0822; H04L 9/0897; H04L 9/3263
See application file for complete search history.

(56) References Cited

U.S. PATENT DOCUMENTS 5,812,664 A * 9/1998 Bernobich ....... G07B 17/00733
380/278
6,681,328 B1 * 1/2004 Harris .................... G06Q 20/02
705/50

(Continued)

FOREIGN PATENT DOCUMENTS

CN    201515456 U * 6/2010
CN    103378966    10/2013
(Continued)

OTHER PUBLICATIONS

Wolf, Marko. "The EVITA Hardware Security Module (HSM)." Deliverable D1. 2.5. 1: Presentation slides from the EVITA project workshop. 2010. (Year: 2010).*

(Continued)

*Primary Examiner* — Shawnchoy Rahman
(74) *Attorney, Agent, or Firm* — Cozen O'Connor

(57) ABSTRACT

A programmable hardware security module, a method for securing a private key of a cryptographic key pair, and a method for securely providing a private key of a cryptographic key pair on a programmable hardware security module, wherein with the described devices and methods, a decentralised PKI is built, via which device keys and device certificates can be generated and target devices can be provided securely, where in this regard, the key-pair-specific transport key plays a central role in protecting the generated private key that is to be transferred, and where this is linked to the particular key pair intended for a target device via a key derivation from a master key utilizing a key-pair-specific derivation parameter.

19 Claims, 3 Drawing Sheets

(56) References Cited

U.S. PATENT DOCUMENTS

| | | | |
|---|---|---|---|
| 6,868,406 B1* | 3/2005 | Ogg | G07B 17/00193 705/401 |
| 2006/0253702 A1* | 11/2006 | Lowell | G06F 21/33 713/156 |
| 2006/0291664 A1 | 12/2006 | Suarez et al. | |
| 2007/0288745 A1* | 12/2007 | Kwan | H04L 9/0822 713/155 |
| 2008/0019526 A1 | 1/2008 | Fu et al. | |
| 2009/0086977 A1 | 4/2009 | Berggren | |
| 2011/0296171 A1* | 12/2011 | Fu | H04L 9/0825 713/156 |
| 2011/0296172 A1 | 12/2011 | Fu et al. | |
| 2013/0163764 A1 | 6/2013 | van den Berg et al. | |
| 2014/0164254 A1* | 6/2014 | Dimmick | G06Q 20/36 705/71 |
| 2016/0344710 A1* | 11/2016 | Khan | H04L 63/061 |

FOREIGN PATENT DOCUMENTS

| | | | | |
|---|---|---|---|---|
| CN | 106385315 A | * | 2/2017 | |
| WO | WO-2012101721 A1 | * | 8/2012 | H04L 63/06 |
| WO | WO 2015/167798 | | 11/2015 | |

OTHER PUBLICATIONS

Doherty, A. et al.: "Dynamic Symmetrie Key Provisioning Protocol (DSKPP)"; Request for Comments: RFC 6063, Dec. 2010. The Internet Engineering Task Force (IETF<ID) [online], URL: https://tools.ietf.org/pdf/rfc6063.pdf; 2010.

https://hsm.utimaco.com/de/cryptoserver/securityserver-se—Security Server Se Gen2—The next generation Industry Standard Hardware Security Module; 2016.

Barker, E. "Recommendation for Key Management, Part 1: General" (SP 800-57 Part 1 Rev. 4). In: NIST Computer Security Resource Center, Jan. 2016. URL: https://csrc.nist.gov/publications/detail/sp/800-57-part-1 /rev-4/final; DOI: 10.6028/NIST.SP.800-57pt1r4; 2016.

PCT International Search Report and Written Opinion of International Searching Authority dated Apr. 4, 2018 corresponding to PCT International Application No. PCT/EP2017/084690 filed Dec. 28, 2017.

Office Action dated Jan. 5, 2021 issued in Japanese Patent Application No. 2019-542376.

Office Action dated Jul. 2, 2021 issued in Chinese Patent Application No. 201780085789.7.

* cited by examiner

METHOD AND PROGRAMMABLE HARDWARE SECURITY MODULE

CROSS-REFERENCE TO RELATED APPLICATIONS

This is a U.S. national stage of application No. PCT/EP2017/084690 filed Dec. 28, 2017. Priority is claimed on German Application No. DE102017201891.7 filed Feb. 7, 2017, the content of which is incorporated herein by reference in its entirety.

BACKGROUND OF THE INVENTION

1. Field of the Invention

The invention relates to a programmable hardware security module, a method for protecting a private key of a cryptographic key pair and to a method for securely providing a private key of a cryptographic key pair on the programmable hardware security module.

2. Description of the Related Art

In the industrial automation setting, cryptographic security methods are necessary to protect data or authenticating communication partners. For cryptographic security mechanisms, cryptographic key material is necessary. In particular, cryptographic key pairs comprising a private and a public key are used. The respective private keys need to be kept secret in this case; public keys or associated data structures, such as digital certificates or security tokens, are made available to the applicable components for processing. To set up a key infrastructure, in particular to distribute cryptographic key material, small automation installations often have no applicable security infrastructure available. Cloud based solutions often cannot be used on account of the regulations in force relating to restricted networks or on account of requirements regarding a local checking capability.

It is a generally known practice to set up and operate central security infrastructures, what are known as PKI or security computer centers. In practice, this is not feasible in all application scenarios.

SUMMARY OF THE INVENTION

Against this background, it is an object of the present invention to provide a secure and easily realizable local security infrastructure.

This and other objects and advantages are achieved in accordance with the invention by a programmable hardware security module, having an application device for generating a cryptographic key pair, a memory area having a master transport key, and a key derivation module for deriving a key-pair-specific transport key from the master transport key by using a key-pair-specific derivation parameter, where the key-pair-specific transport key is usable for encrypting a private key of the cryptographic key pair.

A programmable hardware security module is understood to mean, for example, an open hardware security module or else hardware security module permitting existing commercial software or open source security software to be executed on a protected execution environment. Software packages can be installed in this case and executed with little effort. A programmable hardware security module is protected at the same time, for example, via hardware or software security mechanisms. In this case, the execution environment can be protected using software, configuration data or runtime data. An open hardware security module of this kind affords the opportunity to execute security-critical data and program codes in a Linux runtime environment, for example. Moreover, little effort is needed to realize a local PKI, i.e., a public key infrastructure, to generate certificates.

On the hardware security module, there is provision for an application device via which an application for generating a key pair is available. This is a cryptographic key pair, with a private, secret key and a public key forming the key pair. Moreover, there is a memory area having a master transport key on the hardware security module. This master transport key is provided to protect the private key.

There is provision on the hardware security module for a key derivation module to derive a key-pair-specific transport key by using a key-pair-specific derivation parameter. The key-pair-specific transport key is now usable for encrypting the private key. For every key pair, a specific derivation parameter is used, so that the key-pair-specific transport key is ideally generated only once for every key pair. In other words, all the key-pair-specific transport keys for different key pairs differ among one another. The key-pair-specific derivation parameter is therefore a hallmark of the key pair or the private key or the public key of the key pair. The-key-pair specific derivation parameter is provided to the programmable hardware security module, for example, via an interface or is stored in a memory area.

It is advantageously possible for a simple local PKI to be constructed to generate device keys for a target device and in particular device certificates. The described programmable hardware security module can ensure that a transport key is designed to protect the generated private key on a key-pair-specific basis. By way of example, the generating of key pairs, i.e., private keys and associated certificates, can easily be realized on such a module by using scripts and open source software, such as Open SSL, and at the same time the security of a private key generated in this manner can be ensured by the protection using the key-pair-specific transport key.

In accordance with one embodiment, the programmable hardware security module further has an output unit for outputting the private key as an encrypted file. By way of example, this is what is known as a PEM file having the file format privacy enhanced mail certificate. The outputting is effected in particular to the devices on which the private key of the generated cryptographic key pair is meant to be stored. It is also possible to use a different file format rather than a PEM file, e.g., a PKCS #12 file.

In accordance with one embodiment, the programmable hardware security module additionally has a device for generating a digital certificate comprising a public key of the cryptographic key pair. Advantageously, the digital certificate is also generated directly upon generation of the cryptographic key pair, in particular as a further step. The digital certificate is preferably output, for example, to a target device, to associate the public key contained in the digital certificate with the programmable hardware security module. In particular, the digital certificate has identification data of the programmable hardware security module.

It is a further object of the invention to provide a corresponding programmable hardware security module, having a reception device for receiving a private key of a cryptographic key pair as an encrypted file and a digital certificate comprising a public key of the cryptographic key pair, a memory area having a master transport key, and a key derivation module for deriving a key-pair-specific transport key from the master transport key by using a key-pair-specific derivation parameter, wherein the key-pair-specific transport key is usable for decrypting the encrypted file.

Advantageously, the two modules, referred to in the present application as programmable hardware security module and corresponding programmable hardware security module for the purposes of distinction, are used together in one realization embodiment. In this case, the corresponding programmable hardware security module is used on the target device or on the field device and communicates with the target device, in particular. A common feature of both security modules is the key derivation module in accordance with the invention; only during use of the generated key-pair-specific transport key are the two modules distinguished: the programmable hardware security module generates the private key to be protected in the cryptographic key pair and can advantageously be used to generate a key file encrypted using the key-pair-specific transport key. On the other hand, the corresponding programmable hardware security module uses the likewise generated key-pair-specific transport key, for example, to decrypt the received key file and ultimately to provide the decrypted key file to a target device or field device that is meant to be equipped with the key pair.

In accordance with the guidelines for examination F IV 3.2, it is possible for respective independent claims to be formulated for multiple subjects that complement one another or interact. Such interacting corresponding components are involved in the present case.

By way of example, the encrypted key file is re-encrypted on the corresponding programmable hardware security module and provided to the target device in encrypted form. In particular, a negotiated key between the target device and the corresponding and programmable hardware security module is used for this purpose.

In accordance with another embodiment, the corresponding programmable hardware security module additionally has an interface for transferring the key-pair-specific transport key to a target device. The target device described is therefore provided with the key-pair-specific transport key for decrypting the key file. Following the decryption of the key file, the private key is then present on the field device when required, and also the digital certificate, provided that it is transmitted to the target device.

In accordance with an alternative embodiment, the corresponding programmable hardware security module has additionally includes an interface for transferring the private key to a target device. By way of example, this private key is protected using a symmetric key negotiated especially between the field device and the corresponding programmable hardware security module.

It is also an object of the invention to provide a method for protecting a private key of a cryptographic key pair, having the steps of generating the cryptographic key pair on a programmable hardware security module, deriving a key-pair-specific transport key from a master transport key by using a key-pair-specific derivation parameter, and encrypting the private key using the key-pair-specific transport key.

In accordance with an embodiment, the method further comprises generating a digital certificate comprising a public key of the cryptographic key pair.

It is also an object of the invention to provide a method for securely providing a private key of a cryptographic key pair on a corresponding programmable hardware security module, having the steps of receiving the private key as an encrypted file and a digital certificate comprising a public key of the cryptographic key pair, and deriving a key-pair-specific transport key from a master transport key by using a key-pair-specific derivation parameter, where the key-pair-specific transport key is usable for decrypting the encrypted file.

Again, the methods for protecting a private key and for securely providing a private key on a corresponding programmable hardware security module interact, so that both methods, which can be performed on apparatuses corresponding to one another, are claimed as independent claims in accordance with the provisions in the guidelines as explained above.

In accordance with one embodiment, the method further comprises providing the digital certificate to a target device, decrypting the encrypted file via the key-pair-specific transport key, and providing the decrypted private key to the target device.

In this embodiment, the corresponding programmable hardware security module initially decrypts the private key, in which it has the key-pair-specific transport key itself available and applies it to the key file, and then transfers the private key of the key pair. This transferring is preferably in turn effected not in plain text but rather by using a key agreed with the target device, in particular a symmetric key that has been negotiated using a Diffie-Hellman key exchange method.

In another embodiment, the method further comprises providing the digital certificate to a target device, providing the encrypted file to the target device, and providing the key-pair-specific transport key to the target device.

In this embodiment, the corresponding programmable hardware security module transfers the key-specific transport key to the target device, which can then independently decrypt the key file.

In accordance with a further embodiment, the corresponding programmable hardware security module authenticates the target device. By way of example, this is achieved by virtue of a communication between the corresponding programmable hardware security module and the target device occurring to exchange identification information or credentials of the target device.

Therefore, the transference the decrypted private key or of the key-pair-specific transport key to the target device is advantageously tied to the target device having been authenticated beforehand.

In accordance with another embodiment, the corresponding programmable hardware security module generates a target-device-specific key and provides the private key or the key-pair-specific transport key to the target device in a manner protected using the target-device-specific key.

In accordance with a further embodiment, the key-pair-specific transport key is derived by using a key derivation function for which at least the key-pair-specific derivation parameter and the master transport key are prescribed as input. By way of example, the key derivation function used is for example what is known as an HKDF or HMAC based key derivation function, with what is known as an HMAC hash function being used or what is known as a PBKDF2 or password based key derivation function 2, a standardized function for deriving a key from a password. These exemplary functions firstly have the master transport key prescribed for them, which forms the basis for the key derivation. Secondly, the key-pair-specific derivation parameter is additionally prescribed as an input parameter or derivation parameter.

In accordance with another embodiment, the key-pair-specific derivation parameter is formed from certificate information of the digital certificate, in particular the public key, a device identifier or a hash value of the digital certificate.

By way of example, the key derivation parameter is formed from information of the digital certificate associated with the private key. The digital certificate associated with a private key is, for example, an X.509 certificate or a JSON token. The derivation parameter can be formed, for example, explicitly by using the public key of the generated key pair or by using a device identifier transmitted to the programmable hardware security module or to the corresponding programmable hardware security module together with a key request message, for example by using a serial number. Further, it is possible for a further attribute of the generated certificate, for example, the signature of the certificate, the serial number of the certificate or an additional attribute from a certificate extension, to be used. It is further possible for the entire certificate to be used or a hash value of the entire certificate, such as a hash value generated via the function SHA256.

The cited parameters used for forming the derivation parameter can each be used directly, or it is possible in each case for a hash function to be used to form a hash value based on these data, the hash value then being used as a derivation parameter for the key derivation function. For all the cited examples, it is additionally possible for a derivation parameter selected by the programmable security module or the corresponding programmable hardware security module itself to be used as an option. This can represent an additional security for the generation of the key-pair-specific transport key. The derivation parameter is formed by a derivation parameter formation function or derivation parameter construction function DPCF.

Advantageously, a further node that knows the master transport key can determine the key-pair-specific transport key based solely on the certificate or an information element of the certificate.

The interaction of the protected apparatuses and methods described allows generation and loading of device keys to be realized in a secure manner with little effort.

The modules and devices can be implemented in hardware and/or in software. In the event of a hardware implementation, the respective unit can be of formed as an apparatus or as part of an apparatus, such as in the form of a computer or in the form of a processor or in the form of a microprocessor. In the event of a software implementation, the respective device or the respective module can be formed as a computer program product, as a function, as a routine, or as part of a program code or an executable object. A processor is intended to be understood to mean an electronic circuit for computer based data processing, such as a CPU. It can be the CPU of a computer or can be a microprocessor of a microchip.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained more specifically below based on exemplary embodiments with reference to the figures, in which.

DETAILED DESCRIPTION OF THE EXEMPLARY EMBODIMENTS

Figure 1:
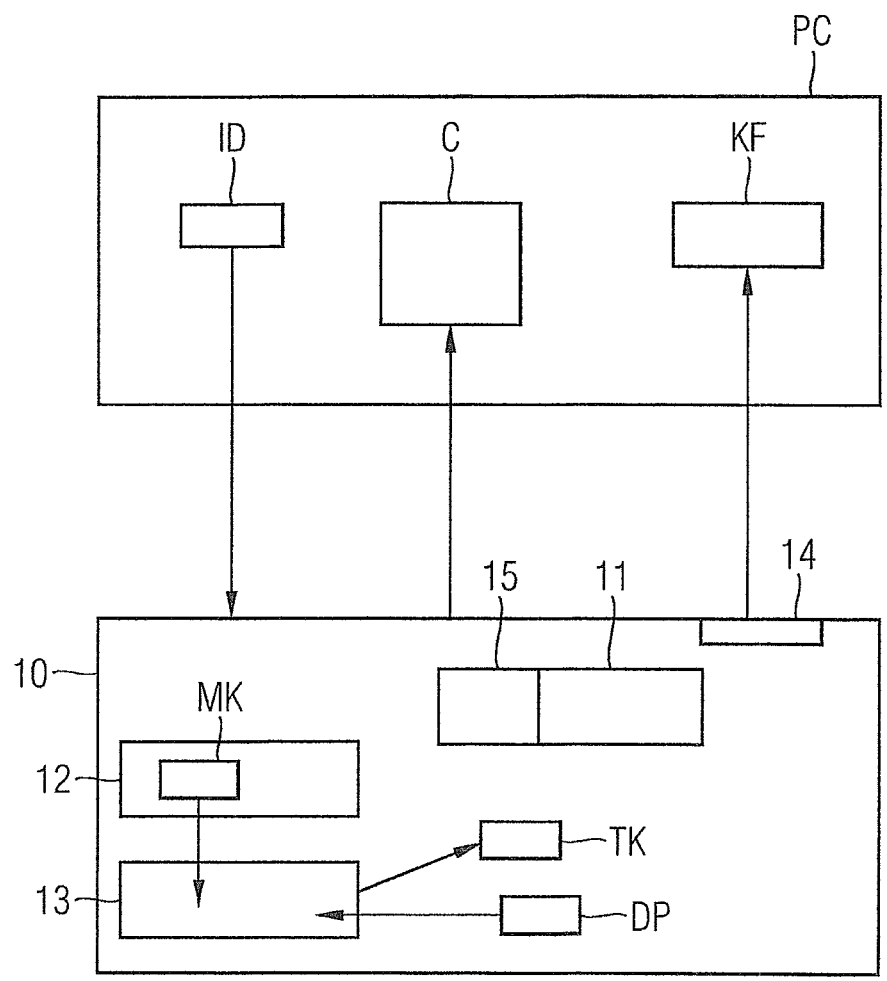
FIG. 1 shows a schematic depiction of a programmable hardware security module in accordance with a first exemplary embodiment of the invention.

FIG. 1 shows a programmable hardware security module 10 that can interchange data with an industrial computer PC. The programmable hardware security module 10 is what is known as an open hardware security module or industrial security module, for example. There is provision on the programmable hardware security module for an application device 11, for example, upon which an application generating an asymmetric key pair is installed, for example. The cryptographic key pair is therefore a pair comprising a public and a private key. By way of example, the application uses a device for generating a digital certificate C to issue this certificate C.

The computer PC, which is meant to be used for equipping a target device, such as a field device, with cryptographic key material in one scenario, transfers an identifier ID of the target device to the programmable hardware security module 10. The latter uses the transferred information to generate a key pair for the target device. The digital certificate C is deposited on the computer PC, for example, in order to be able to transmit it to the field device later. There is furthermore provision on the programmable hardware security module 10 for a memory area 12 that has a master transport key MK. This master key MK preferably needs to be deposited in protected form. By way of example, there is provision for antitamper measures in order to protect the master key MK needing to be kept secret against illegal reading or manipulation. There is furthermore provision on the programmable hardware security module 10 for a key derivation module 13 that derives a key-pair-specific transport key TK from the master transport key MK by using a key-pair-specific derivation parameter DP. The master transport key MK is made available to the key derivation module 13 internally from the memory area. The key-pair-specific derivation parameter DP can be provided on the programmable hardware security module 10 in one embodiment or alternatively made available to the key derivation module 13 externally. The derived key-pair-specific transport key TK is available on the programmable hardware security module 10 and usable, in particular in an advantageous manner, for encrypting the generated private key of the cryptographic key pair. By way of example, an encrypted file KF is generated and the file is made available to the computer PC on an output unit 14 of the programmable hardware security module 10.

Figure 2:
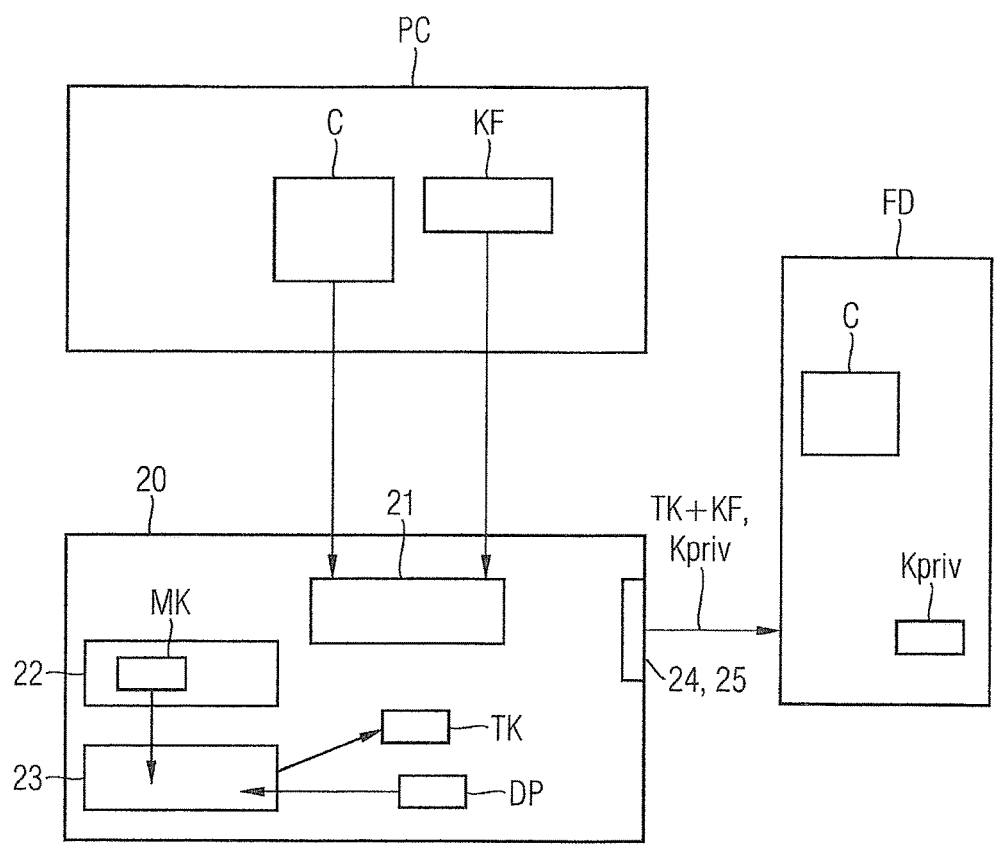
FIG. 2 shows a schematic depiction of a corresponding programmable hardware security module in accordance with a second exemplary embodiment of the invention.

FIG. 2 shows a corresponding programmable hardware security module 20 that can advantageously be used in conjunction with the computer PC described in connection with FIG. 1. Additionally, the corresponding programmable hardware security module 20 is in contact with a field device FD or target device. In particular, the corresponding programmable hardware security module 20 can transmit data to the field device FD. This occurs via an interface 24, 25. The corresponding programmable hardware security module 20 has a reception device for receiving a private key, which is received from the computer PC in encrypted or unencrypted form. In particular, the computer PC described in connection with FIG. 1 transmits an encrypted key file KF to the corresponding programmable hardware security module 20. Similarly, a certificate C, which has been deposited on the computer PC in accordance with the description of the first exemplary embodiment, is now transmitted from the computer PC to the reception device 21 in an advantageous manner. There is furthermore provision on the corresponding programmable hardware security module 20 for a memory area 22 having a master transport key MK.

For the scenario described, in which the programmable hardware security module 10 explained with reference to FIG. 1 is meant to interact with the corresponding programmable hardware security module 20 described with reference to FIG. 2, the identical master transport key MK is to be deposited on the two modules. It is then possible, in an advantageous manner, for a key derivation module 23 provided on the corresponding programmable hardware security module 20 to be used to derive the identical key-pair-specific transport key from the master transport key MK by using a key-pair-specific derivation parameter DP. This also requires a provided key derivation function to be concordant with the one on the programmable hardware security module 10, and also the key-pair-specific derivation parameter DP used. If the key-pair-specific derivation parameter DP is generated directly on the respective module from the public key or a digital certificate of the public key, then the identical key-pair-specific derivation parameter DP is generable on both modules in each case. Further parameters used and the function for generating the derivation parameter are identical for this purpose. By way of example, the key-pair-specific derivation parameter DP is generated on both modules by virtue of a hash value for the whole digital certificate C being generated. This is advantageously possible if the information of the digital certificate C is available on both modules, whether as a result of separate generation or as a result of reception from the computer PC, and an identical hash function is applied.

The key-pair-specific transport key TK generated on the corresponding programmable hardware security module 20 can be used to decrypt the received encrypted file KF, for example. The private key of the key pair provided for the target device FD is then available on the corresponding programmable hardware security module 20 and can be transferred to the field device FD via the interface 25, for example. The private key Kpriv is then available on the field device FD. The certificate C is also transmitted to the target device in an advantageous manner, so that the key material has therefore been deposited on the field device FD in a secure manner. Similarly, it is advantageously possible to use an interface 24 to transmit the encrypted file KF and the generated key-pair-specific transport key TK to the field device FD. On the field device FD, it is then possible for the key file KF to be decrypted, so that finally, in this embodiment, the private key Kpriv is also present on the field device FD.

The two modules are used in an advantageous manner in the production or on startup of a field device when the key material, i.e., a certificate and the associated private key, needs to be deposited on the field device FD. In an advantageous manner, there is provision for different interfaces for outputting the key-pair-specific transport key TK and the encrypted file with the private key KF, so that the two pieces of information are output in different ways. By way of example, there is provision for a display and a further output unit, for example wired.

In one embodiment, all of the keys of the application, such as the master transport key MK and a signature of the certification entity for signing the certificate, are permanently coded in the application. Further, fields of the certificate C to be issued may additionally be firmly prescribed in the application, so that during use of the application it is merely necessary for the device ID of the target device FD to be transferred in order to create the digital certificate C for the field device FD thus identified. Alternatively, the parameters can be set in the application by configuration messages. Following activation of the application by an activation command, they are then no longer able to be changed.

Particularly advantageously, the encrypted key file KF containing the private key in encrypted form is decrypted on the corresponding programmable hardware security module and re-encrypted using a key specific to the target device DF. By way of example, this key is dynamically negotiated between the corresponding hardware security module 20 and the target device DF via a Diffie-Hellman key exchange. The thus converted key file KF is transferred to the target device DF and decrypted by the target device DF. In particular, a separate communication interface such as for example JTAG or SPI is used for this transfer.

Figure 3:
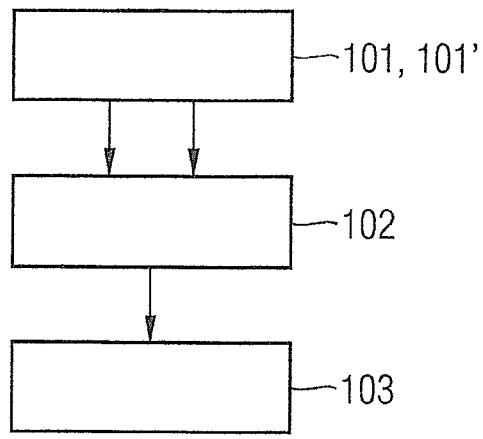
FIG. 3 shows a block diagram to schematically depict a method for protecting a private key in accordance with the first exemplary embodiment of the invention.

FIG. 3 schematically shows the method steps for a method for protecting a private key of a cryptographic key pair in accordance with the first exemplary embodiment. The cryptographic key pair is generated 101 on a programmable hardware security module, for example, the programmable hardware security module explained in the first exemplary embodiment with reference to FIG. 1. Further, a key-pair-specific transport key is derived 102 from a master transport key by using a key-pair-specific derivation parameter. Further, a file having the private key is encrypted 103 using the key-pair-specific transport key. Steps 101 and 102 can be performed separately from one another and in particular in a variable order, here.

Additionally and either at the same time or at a time following step 101, a digital certificate comprising a public key of the cryptographic key pair is generated 101'.

Figure 4:
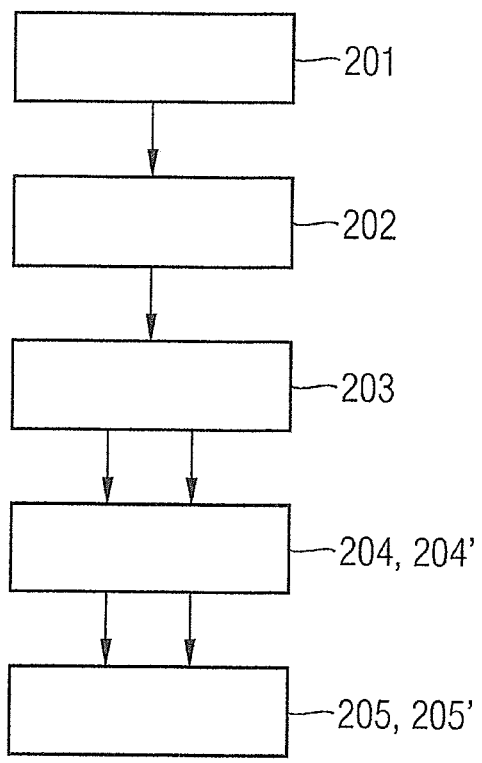
FIG. 4 shows a block diagram to schematically depict a method for securely providing a private key in accordance with the second exemplary embodiment of the invention.

FIG. 4 shows a method for securely providing a private key of a cryptographic key pair on a corresponding programmable hardware security module, in particular on the corresponding programmable hardware security module explained in the second exemplary embodiment with reference to FIG. 2. The private key as an encrypted file and a digital certificate comprising a public key of the cryptographic key pair are received 201. Further, a key-pair-specific transport key is derived 202 from a master transport key by using a key-pair-specific derivation parameter. Steps 201 and 202 can be performed separately from one another and in particular with variable timing either with parallel timing or with staggered timing, here.

Further, the digital certificate is provided 203 to a target device. In one embodiment, the encrypted file is decrypted 204 via the key-pair-specific transport key, and the decrypted private key is provided 205 to the target device. Here, the two steps 204 and 205 can be performed either with staggered timing or at the same time relative to step 203. As an alternative to step 204, it is also possible for the encrypted file to be provided 204' to the target device and for the key-pair-specific transport key to be provided 205' to the target device. Here, the two steps 204' and 205' can be performed either with staggered timing or at the same time relative to step 203. Steps 204' and 205' are again performable in any order.

Although the invention has been illustrated and described more specifically in detail by the exemplary embodiments, the invention is not limited by the disclosed examples, and other variations can be derived therefrom by a person skilled in the art without departing from the scope of protection of the invention.

The apparatuses and methods described are used to set up a local PKI by means of which device keys and device certificates can be generated and can be provided to target devices in a protected manner. A central part is played in this case by the key-pair-specific transport key for protecting the generated private key to be transferred. The latter is tied to the key pair provided in each case for a target device by means of a key derivation from a master key by using a key-pair-specific derivation parameter. This realizes the generating and loading of device keys with little effort and in a reliable manner.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A programmable hardware security module, comprising:
    an application device for generating a cryptographic key pair;
    a memory area having a master transport key;
    a key derivation module for deriving a key-pair-specific transport key from the master transport key via a key-pair-specific derivation parameter which is generated once for every derived key-pair-specific transport key such that all derived key-pair-specific transport keys for different cryptographic key pairs differ among one another; and
    a device for generating a digital certificate comprising a public key of the cryptographic key pair and including identification data of the programmable hardware security module, the digital certificate being simultaneously generated upon generation of the cryptographic key pair;
    wherein the key-pair-specific transport key is utilized to encrypt a private key of the cryptographic key pair.

2. The programmable hardware security module as claimed in claim 1, further comprising:
    an output unit for outputting the private key as an encrypted file.

3. A corresponding programmable hardware security module, comprising:
    a reception device for receiving a private key of a cryptographic key pair as an encrypted file and a digital certificate comprising a public key of the cryptographic key pair;
    a memory area having a master transport key;
    a key derivation module for deriving a key-pair-specific transport key from the master transport key via a key-pair-specific derivation parameter which is generated once for every derived key-pair-specific transport key such that all derived key-pair-specific transport keys for different cryptographic key pairs differ among one another; and
    a device for generating a digital certificate comprising a public key of the cryptographic key pair and including identification data of the corresponding programmable hardware security module, the digital certificate being simultaneously generated upon generation of the cryptographic key pair;
    wherein the key-pair-specific transport key is utilized to decrypt the encrypted file.

4. The corresponding programmable hardware security module as claimed in claim 3, further comprising:
    an interface for transferring the key-pair-specific transport key to a target device.

5. The corresponding programmable hardware security module as claimed in claim 3, further comprising:
    an interface for transferring the private key to a target device.

6. A method for protecting a private key of a cryptographic key pair, comprising:
    generating the cryptographic key pair on a programmable hardware security module;
    deriving a key-pair-specific transport key from a master transport key via a key-pair-specific derivation parameter which is generated once for every derived key-pair-specific transport key such that all derived key-pair-specific transport keys for different cryptographic key pairs differ among one another;
    encrypting the private key using the key-pair-specific transport key; and
    generating a digital certificate comprising a public key of the cryptographic key pair and including identification data of the programmable hardware security module, the digital certificate being simultaneously generated upon generation of the cryptographic key pair.

7. A method for securely providing a private key of a cryptographic key pair on a corresponding programmable hardware security module, comprising:
    receiving the private key as an encrypted file and a digital certificate comprising a public key of the cryptographic key pair and including identification data of the programmable hardware security module, the digital certificate being previously simultaneously generated upon generation of the received cryptographic key pair; and
    deriving a key-pair-specific transport key from a master transport key via a key-pair-specific derivation parameter which is generated once for every derived key-pair-specific transport key such that all derived key-pair-specific transport keys for different cryptographic key pairs differ among one another;
    wherein the key-pair-specific transport key is utilized to decrypt the encrypted file.

8. The method as claimed in claim 7, further comprising:
    providing the digital certificate to a target device;
        decrypting the encrypted file via the key-pair-specific transport key; and providing the decrypted private key to the target device.

9. The method as claimed in claim 7, further comprising:
providing the digital certificate to a target device;
providing the encrypted file to the target device; and
providing the key-pair-specific transport key to the target device.

10. The method as claimed in claim 7, wherein the corresponding programmable hardware security module authenticates the target device.

11. The method as claimed in claim 8, wherein the corresponding programmable hardware security module authenticates the target device.

12. The method as claimed in claim 9, wherein the corresponding programmable hardware security module authenticates the target device.

13. The method as claimed in claim 7, wherein the corresponding programmable hardware security module generates a target-device-specific key and provides one of (i) the private key and (ii) the key-pair-specific transport key to the target device in a manner protected utilizing the target-device-specific key.

14. The method as claimed in claim 6, wherein the key-pair-specific transport key is derived via a key derivation function for which at least the key-pair-specific derivation parameter and the master transport key are prescribed as input parameters.

15. The method as claimed in claim 7, wherein the key-pair-specific transport key is derived via a key derivation function for which at least the key-pair-specific derivation parameter and the master transport key are prescribed as input parameters.

16. The method as claimed in claim 6, wherein the key-pair-specific derivation parameter is formed from certificate information of the digital certificate.

17. The method as claimed in claim 16, wherein the certificate information of the digital certificate comprises one of (i) the public key, (ii) a device identifier and (iii) a hash value of the digital certificate.

18. The method as claimed in claim 7, wherein the key-pair-specific derivation parameter is formed from certificate information of the digital certificate.

19. The method as claimed in claim 18, wherein the certificate information of the digital certificate comprises one of (i) the public key, (ii) a device identifier and (iii) a hash value of the digital certificate.

* * * * *